US009754115B2

(12) United States Patent
Bodis et al.

(10) Patent No.: US 9,754,115 B2
(45) Date of Patent: Sep. 5, 2017

(54) SYSTEM AND METHOD FOR SECURELY BINDING AND NODE-LOCKING PROGRAM EXECUTION TO A TRUSTED SIGNATURE AUTHORITY

(75) Inventors: Michael Louis Bodis, Ottawa (CA); Jiayuan Sui, Burlington (CA); Grant Stewart Goodes, Manotick (CA); Clifford Liem, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 618 days.

(21) Appl. No.: 14/006,352

(22) PCT Filed: Mar. 21, 2011

(86) PCT No.: PCT/CA2011/050150
§ 371 (c)(1),
(2), (4) Date: Sep. 20, 2013

(87) PCT Pub. No.: WO2012/126077
PCT Pub. Date: Sep. 27, 2012

(65) Prior Publication Data
US 2014/0006803 A1    Jan. 2, 2014

(51) Int. Cl.
*G06F 21/60* (2013.01)
*H04L 9/32* (2006.01)
(Continued)

(52) U.S. Cl.
CPC ............ *G06F 21/602* (2013.01); *G06F 21/51* (2013.01); *G06F 21/645* (2013.01); *H04L 9/321* (2013.01); *H04L 9/3247* (2013.01); *H04L 63/12* (2013.01)

(58) Field of Classification Search
CPC ...... G06F 21/602; G06F 21/645; G06F 21/51; H04L 9/3247; H04L 9/321; H04L 63/12
See application file for complete search history.

(56) References Cited

U.S. PATENT DOCUMENTS 5,652,793 A * 7/1997 Priem .................... G06F 21/10
   340/5.74
5,944,821 A * 8/1999 Angelo .................. G06F 21/51
   726/22
(Continued)

FOREIGN PATENT DOCUMENTS

EP    1879321        1/2008
WO    9703398 A1    1/1997
(Continued)

OTHER PUBLICATIONS

Extended European Search Report cited in corresponding European Application No. 11861358.7 dated Jul. 17, 2014.
(Continued)

*Primary Examiner* — Michael Pyzocha
(74) *Attorney, Agent, or Firm* — Rimon, P.C.; Marc Kaufman

(57) ABSTRACT

A system and method is disclosed for securely binding an arbitrary program to an authorized instance of a generic execution platform. Once the binding process occurs, the protected software application will not exhibit correct behavior unless run on the execution platform to which it is bound. The system and method withstands repeated attacks which tamper with the software application and the execution platform. The system and method present a mechanism to bind a program, P, to any un-trusted execution platform, E, which contains a Trusted Signing Authority (TSA). The TSA may take many alternate forms including a trusted platform module, secure processor, kernel driver, and hardened software agents.

26 Claims, 6 Drawing Sheets

(51) Int. Cl.
*G06F 21/64* (2013.01)
*G06F 21/51* (2013.01)
*H04L 29/06* (2006.01)

(56) References Cited

U.S. PATENT DOCUMENTS

| | | | | |
|---|---|---|---|---|
| 6,442,276 B1* | 8/2002 | Doljack | ................. | G06K 17/00 380/51 |
| 6,463,538 B1* | 10/2002 | Elteto | ................. | G06F 21/125 713/190 |
| 7,552,333 B2 | 6/2009 | Wheeler et al. | | |
| 7,788,483 B1 | 8/2010 | Falik et al. | | |
| 8,954,738 B2* | 2/2015 | Asokan | .................. | H04L 63/12 713/168 |
| 2002/0138554 A1* | 9/2002 | Feigen | .................. | H04L 63/123 709/203 |
| 2002/0152392 A1* | 10/2002 | Hardy | .................... | G06F 21/10 713/189 |
| 2003/0120938 A1* | 6/2003 | Mullor | .................. | G06F 21/14 713/190 |
| 2004/0098591 A1* | 5/2004 | Fahrny | ................... | G06F 21/72 713/176 |
| 2004/0125954 A1* | 7/2004 | Riebe | ................. | G06F 21/125 380/231 |
| 2005/0216422 A1* | 9/2005 | Lotspiech | ............... | G06F 21/64 705/66 |
| 2005/0289343 A1 | 12/2005 | Tahan | | |
| 2006/0101047 A1* | 5/2006 | Rice | ......... | G06F 21/52 |
| 2007/0006183 A1 | 1/2007 | Mensch et al. | | |
| 2008/0025510 A1 | 1/2008 | Yung et al. | | |
| 2008/0092235 A1* | 4/2008 | Comlekoglu | ......... | G06F 11/326 726/22 |
| 2008/0209559 A1* | 8/2008 | Zunke | ................. | G06F 21/64 726/23 |
| 2008/0229426 A1* | 9/2008 | Saitoh | .................... | G06F 21/10 726/26 |
| 2009/0172814 A1* | 7/2009 | Khosravi | ................ | G06F 21/51 726/23 |
| 2009/0177894 A1 | 7/2009 | Orsini et al. | | |
| 2009/0249071 A1* | 10/2009 | De Atley | ............ | G06F 21/6218 713/171 |
| 2010/0192021 A1* | 7/2010 | Boehl | ....................... | G05B 9/03 714/47.1 |
| 2010/0235912 A1* | 9/2010 | Hermann | ................. | G06F 21/57 726/23 |
| 2010/0275026 A1* | 10/2010 | Mclean | .................... | G06F 21/12 713/176 |
| 2010/0281273 A1* | 11/2010 | Lee | ........................ | G06F 21/72 713/190 |
| 2012/0004033 A1* | 1/2012 | Lyons | ................. | G06F 3/04886 463/35 |
| 2012/0144480 A1* | 6/2012 | Miller | ................. | G06F 21/6218 726/22 |
| 2012/0159178 A1* | 6/2012 | Lin | ....................... | H04L 9/3247 713/178 |

FOREIGN PATENT DOCUMENTS

| | | |
|---|---|---|
| WO | 0113198 | 2/2001 |
| WO | 2005064433 A1 | 7/2005 |
| WO | 2010013092 | 2/2010 |
| WO | 2010108554 | 9/2010 |

OTHER PUBLICATIONS

Dalheimer et al,: "GenLM: License Management for Grid and Cloud Computing Environments", Cluster Computing and the Grid, 2009.CCGRID '09. 9th IEEE/ACM International Symposium on, IEEE, Piscataway, NJ. May 18, 2009.

International Search Report and Written Opinion dated Dec. 20, 2011.

* cited by examiner

SYSTEM AND METHOD FOR SECURELY BINDING AND NODE-LOCKING PROGRAM EXECUTION TO A TRUSTED SIGNATURE AUTHORITY

FIELD OF THE INVENTION

The present invention relates generally to prevention of unauthorized use of software. More particularly, the present invention relates to software protection by way of binding and node-locking software applications to a trusted signature authority.

BACKGROUND OF THE INVENTION

In the software industry, it is often desirable to limit access to a given software application for reasons that may include preventing unauthorized use (e.g., unlicensed pirating) or unauthorized manipulation (e.g., hacking). One known solution to unauthorized use of software is to bind any given software application to a specific computer or device. In this manner, the software application may then only be executed on the respective licensed device. This binding of the software application to a specific device is commonly known as node-locking or alternatively referred to as hardware-software anchoring.

The traditional approach to node-locking has been to take a unique identifier (ID) from a piece of hardware and make the software application dependent on the given ID. The number and characteristics of these unique IDs vary greatly from platform to platform. Some common hardware identifiers include: the Media Access Control (MAC) address, the Hard-Disk Drive Identifier (HDD ID), and a Serial Number (SN). Additional node-locking identifiers can include Basic Input/Output System (BIOS) values, hash values computed by a driver hash function, device IDs, or any similar identifier unique to a given hardware device or element. In the traditional approach to node-locking, anchoring a piece of software (i.e. the application) to a particular node is a matter of creating a dependency from the unique ID to the functioning of the software. In some systems, this may be a set of mathematical operations that derive a key from a unique ID. In other systems, an algorithm may be devised that requires a subset of unique IDs to be valid while allowing all others to be incorrect. The latter allows for variation in the hardware itself—for example, a network interface card may be removed from a computer.

In a white-box attack context, the attacker has full knowledge of the system being attacked and therefore full control over the execution of the software. The attacking intruder may or may not be a legitimate user of the software, though the execution of the software is assumed to proceed normally. There are many difficulties with the security of the traditional approach to node-locking in a white-box attack scenario. The hardware IDs must typically be read during execution, and this characteristic therefore makes them easy to replicate. A variety of these types of white-box attacks follow.

In one scenario, at the point where the software application calls the Application Programming Interface (API) which queries the unique ID of the device, an attacker may replace this call with a hard-coded value. This may be a function that the attacker replaces in the software application code itself, or it could simply be the data area where the software application is expecting to obtain the ID. If the attacker can mount this attack, he can replace the unique ID with any chosen value, thereby rendering the node-locking protection ineffective. Further, a typical extension of hard-coding attacks is the creation of an exploit. As an attacker learns where to hard-code an important value, he also becomes enabled in creating an automatic program (i.e., exploit) to modify, and hence, replicate the software application on any device. This automation removes the need for the attacker to distribute and publish his knowledge about how to mount the attack because the exploit does this job for him.

A second common attack scenario on unique IDs is emulation. Virtual machines (such as VMware™ available from VMWARE INC of Palo Alto, Calif., Xen™ available as freeware from Xen.org, and others) are technologies that mimic the hardware devices beneath an operating system (OS) with a software layer. Such emulation is typically so sophisticated that all device drivers and kernel services are fully supported in software. In this manner, any unique IDs may also be easily changed or replicated with virtual machine technology.

A third common attack on unique IDs is a simple re-implementation of a system or sub-system that performs the node-locked actions with the node-locking protections removed. Following a simple observation of the unique IDs that are in use for the system under attack, an attacker may typically re-implement the parts that use the unique ID in assembly code, C programming, or the like.

It is, therefore, desirable to provide a system and method for overcoming problems associated with the traditional approach to node-locking.

SUMMARY OF THE INVENTION

It is an object of the present invention to obviate or mitigate at least one disadvantage of previous approaches to node-locking.

The present invention described herein below solves the aforementioned problem by securely binding an arbitrary program to an authorized instance of a generic execution platform. Once the binding process occurs, the protected software application will not exhibit correct behavior unless it is run on the execution platform to which it is bound. This holds true even in the presence of many attacks which tamper with the software application and the execution platform. In accordance with the embodiments of the present invention, the attacker is assumed to have full white-box access to the specification of the execution platform, and has full white-box control over the execution of the software application. In general, the inventive system and method presents a mechanism to bind a program, P, to any un-trusted execution platform, E, which contains a Trusted Signing Authority (TSA). In terms of the present invention, the TSA may take many alternate forms as described in more detail in the detailed description.

In a first aspect, the present invention provides a system for secure operation of a software application, the system including: a source of entropy for generation of a secret value; a provisioning mechanism for binding the secret value to one or more portions of the software application so as to form a protected program; and a trusted signing authority in communication with the provisioning mechanism, the provisioning mechanism further binding the secret value to the trusted signing authority; wherein the trusted signing authority in conjunction with the secret value provides verification of the protected program.

In a further aspect, the present invention provides a method for secure operation of a software application, the method including: generating a secret value from a source of entropy; binding, via a provisioning mechanism, the secret value to one or more portions of the software application so as to form a protected program; communicating the secret value to a trusted signing authority; and verifying the protected program by way of the trusted signing authority in conjunction with the secret value.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Generally, the present invention provides a system and method for a signing-based node-locking mechanism that includes binding a program, P, to any untrusted execution platform, E, containing a TSA which itself may take many alternate forms. With regard to FIGS. 1A and 1B, there is shown generally the overall flow of the present inventive signing-based node-locking mechanism.

Figures 1A, 1B:
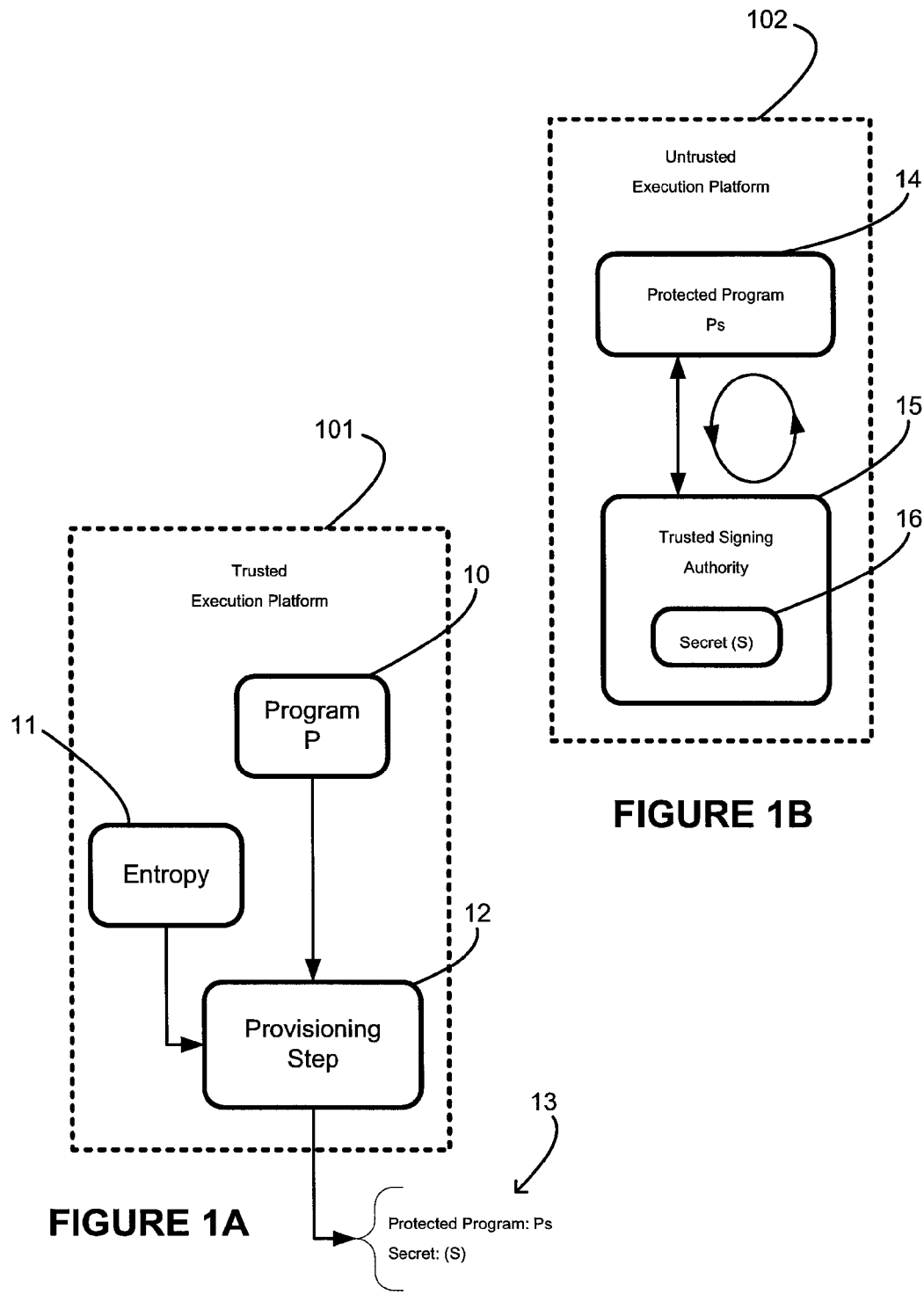
FIGS. 1A and 1B illustrate the general flow processes in accordance with the present invention.

With specific regard to FIG. 1A, the process begins with an off-line process on a trusted execution platform 101 to create a protected program. The off-line binding process takes the original program, P, 10 and a seed from a source of entropy 11 as an input to a provisioning step 12. The entropy 11 is used in part to determine the value of a secret, S, and is further described in more detail herein below. In general, the secret, S, may be, for example, a public/private key pair. The provisioning step 12 produces a secret, S, and a protected program, $P_S$ as output 13. More specifically, the provisioning step 12 produces a uniquely diverse protected program, $P_S$, 14 that is destined for the untrusted execution platform 102 shown in FIG. 1B. It should be understood that the binding process of FIG. 1A occurs one time only for each hardware-software instance.

Although shown separated for purposes of illustrative clarity, it should be readily apparent that the trusted execution platform 101 as seen by way of FIG. 1A may or may not be a separate entity from the untrusted execution platform 102. Indeed, the trusted execution platform 101 and the untrusted execution platform 102 may be one in the same without straying from the intended scope of the present invention, if, for example, the inventive binding process is executed in a one-time secure initialization under an orthogonal set of security conditions. In accordance with the present invention, it should be understood that the binding process of FIG. 1A must securely communicate once with the TSA 16 such that the secret, S, 16 may be embedded into the untrusted platform 102 as shown. However, the protected program, $P_S$, 14 may be made publicly available.

Following the binding process as shown in FIG. 1A, execution on the untrusted execution platform 102 may occur an unbounded number of times. The protected program, $P_S$, 14 is inextricably bound to the TSA 15 through the secret, S, 16. Communication with the TSA is on-going (as indicated by the circular arrow shown between the protected program, $P_S$, 14 and the TSA 15) during the execution of the program 14 and the correct behavior of the program 14 is dependent on the correct communication with the TSA 15. Correct operation of the protected program 14 will therefore only occur by obtaining results computed by the TSA 15, with the exact values of the results being determined by the previously provisioned secret, S, 16. The TSA 15 may take on various alternate forms described further below and is assumed to be bound to the platform. The secret, S, 16 is also assumed to be securely and secretly stored and bound to the TSA 15. Moreover, if the protected program, $P_S$, 14 were executed on a platform not containing the TSA 15 and/or the secret, S, 16, then the protected program, $P_S$, 14 would not execute correctly.

As previously suggested in general above, the TSA provides the functional lock for the node-locking mechanism in accordance with the present invention. The TSA includes the ability to securely contain and store a secret, S, and can perform signing of data as requested by the application. A variety of embodiments for the TSA itself may exist within the constraints and intended scope of the present invention.

The TSA may be a Trusted Platform Module (TPM). In computing, TPM is both the name of a published specification detailing a secure crypto-processor that can store cryptographic keys that protects information, as well as the generic name of implementations of that specification, often called the "TPM chip" or "TPM Security Device." The TPM specification is the work of the Trusted Computing Group. The current version of the TPM specification is 1.2 Revision 103, published on Jul. 9, 2007. This specification is also available as the international standard ISO/IEC 11889. A TPM offers facilities for the secure generation of cryptographic keys, and limitation of their use, in addition to a hardware Pseudo-Random Number Generator (PRNG). The present invention makes use of one to three facilities of the TPM, namely, a public-key algorithm (such as the Rivest-Shamir-Adleman (RSA) algorithm or Elliptic Curve Cryptography (ECC) algorithm for public-key cryptography), a symmetric-key algorithm (such as the Advanced Encryption Standard (AES) algorithm which is a symmetric-key encryption standard adopted by the U.S. government), and a Secure PRNG (a pseudo-random number generator suitable for cryptographic applications).

The TSA may alternatively be formed by a secure processor such as in Set Top Box (STB) implementations whereby manufacturers include chip sets with security mechanisms to protect the programs within the equipment. Many modern System-On-Chip (SOC) implementations for such systems as STBs and also smartphones and other devices include multiple processors on a single chip. This includes a Central Processing Unit (CPU) for most of the main processing, but also the aforementioned secure processor which has limited program space and constrained I/O to the rest of the chip. The secure processor can be used for critical security tasks such as a secure boot or for essential cryptographic processing. This type of SOC provides the opportunity to house any of a number of algorithms such as RSA, ECC, AES, Data Encryption Standard (DES), triple DES (3DES), and random number generation (i.e., PRNG) to run in a secure environment. The present invention described herein may therefore use the secure processor as the TSA.

The TSA may also be a kernel driver of the Ring 0 type. Modern operating systems (OS) include privileged execution rings. Ring 0 is the level with the most privileges and interacts most directly with the physical hardware such as the CPU and memory. On operating systems such as Windows™ OS or Linux™ OS, device drivers and kernel-level drivers typically execute at Ring 0, whereas application code typically runs at Ring 3. A TSA may run as software running at Ring 0. As is known in the programming art, this may be accomplished by creating a custom kernel driver with the appropriate cryptographic algorithms. In the case of the kernel driver, special handling should be taken into account to ensure that the secret, S, cannot be revealed. While the kernel is harder to attack than the application level, it is nevertheless embodied in software and may therefore be attacked through memory-dumps, debugging, and the like.

Still further, the TSA may also be a hardened software agent such as Dynamic Code Decryption (DCD). Examples of software protected using hardened software agents are described in U.S. Pat. No. 6,594,761, U.S. Pat. No. 6,779,114, and U.S. Pat. No. 6,842,862 which each describe the necessary the means to create a hardened software agent. The contents of said references are incorporated by reference herein. Such a hardened software agent may provide the services of the TSA for a specific node.

The above-mentioned implementations of the TSA may also be combined. For example, hardened software agents can appear at Ring 0 or on a secure processor. Such variations of the TSA are therefore well within the intended scope of the present invention.

In terms of operation of the system and method in accordance with the present invention, provisioning will now be described in terms of the binding process generally shown in FIG. 1A. Here, the creation of the node-locked program 13 occurs in a trusted execution session by a trusted party (i.e., the trusted platform 101). The process is described generally as the following steps:

1) On the trusted platform, use a source of entropy which is provisioned so as to generate a secret, S;

2) On the trusted platform, provision the program, P, based on the secret, S to create $P_S$, which is a program that is dependent on the secret, S, for correct functionality;

3) Use a trusted session to communicate the secret, S, from the trusted platform to the TSA on the untrusted platform; and 4) Install the program, $P_S$, into the untrusted platform or make it publicly available for later use.

In a first embodiment, the present invention is provided based on using a public-key algorithm (e.g., RSA) as the signing method and using a symmetric-key algorithm (e.g., AES) to create a secure channel.

First, using a PRNG and a random seed as a source of entropy, a standard key generation algorithm is used to generate a public/private verification key pair (K_pub_ver, K_pri_ver) for the RSA public key algorithm. Additionally, a symmetric key is generated for the AES algorithm. This is used as a communication key (T_key), which may be a symmetric key. Together, K_pub_ver, K_pri_ver and T_key represent the secret, S. It should be further understood that in some implementations, K_pub_ver may not have to be secret. However, in such instances K_pub_ver must be non-malleable within the provisioned application to ensure public key integrity.

Next, the program is provisioned based on the secret, S. Such provisioning may be accomplished by known software protection methods for protection from white-box attacks including, for example, those methods known and described in U.S. Pat. Nos. 7,809,135 and 7,397,916. The contents of said references are incorporated by reference herein. In terms of the present invention, this provisioning amounts to a fixed-key white-box AES implementation of the secure channel using T_key and a fixed-key white-box RSA implementation of the verify operation (i.e., RSA exponentiation) using K_pub_ver. These two implementations become an essential part of the bound program, $P_S$. Thereafter, a secure session is used to communicate the private key, K_pri_ver, to the TSA. The program, $P_S$, is then installed on the untrusted platform. In this manner, the provisioned software application is now individualized for the untrusted platform and bound to the TSA, based on the secret in two parts: 1) the public/private key pair (K_pub_ver, K_pri_ver); and, 2) the secure channel symmetric key (T_key).

Node-locked execution on an untrusted platform in accordance with the first embodiment of the present invention generally involves the program, $P_S$, executing on the untrusted platform, while being bound to the TSA. This is achieved through a series of on-going steps which can occur one or more times. It should be understood that more frequent execution of these steps will result in higher locking strength but lower performance. Thus, such execution frequency is customizable such that the user may specify the rate at which node-verifications may occur with the obvious performance-security trade-offs. The general process is described as follows:

1) A challenge is generated by creating a random message (i.e., a cryptographic nonce);

2) The random message goes in two directions: to the TSA for signing and toward the application (i.e., protected program, $P_S$) for equivalency verification;

3) The TSA signs the message using the secret; and

4) The message signature is passed back to the application via a secure channel.

It should be understood that the run-time behavior of the application is dependent on the verification of the signatures.

Figure 2:
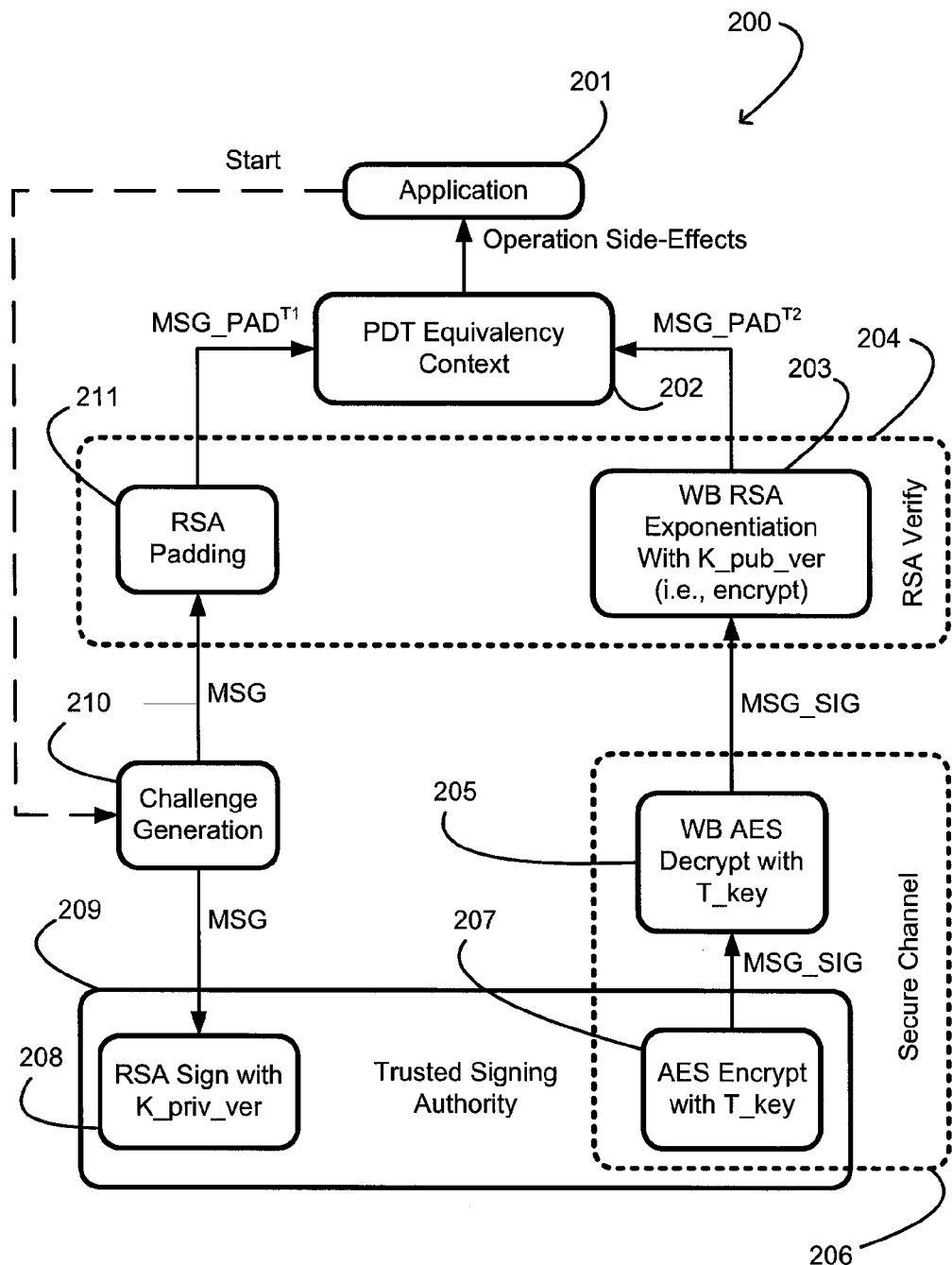
FIG. 2 is a flow diagram in accordance with a first embodiment of the present invention executed on an untrusted platform.

With regard to FIG. 2, there is more specifically shown node-locked execution on an untrusted platform in accordance with a first embodiment 200 of the present invention. Here, node-locked execution in terms of the first embodiment of the present invention is provided based on using RSA as the signing method and using AES to create a secure channel. However, it should be understood that the signing method is not limited to RSA and may use any other suitable asymmetric or symmetric algorithm, and likewise the secure channel may be created by other suitable means than AES without straying from the intended scope of the present invention. In terms of steps, node-locked execution in FIG. 2 occurs as follows.

In step 1, the process begins with a challenge generation 210. Two inputs are used to produce a message, MSG, in the challenge generation 210. The inputs include: a) function arguments from the application 201, and b) a randomly generated number (ideally from a random number generator resistant to a white-box attack). Each set of messages, MSG, represents a unique sequence of challenges for all different external input sequences to the application 201 regardless of a compromise of the random number generation. One advantage of using this form of message generation versus a fixed message is to resist replay attacks.

In step 2, the message, MSG, travels in two directions: toward the TSA 209 and toward the application 201.

In step 3, the message, MSG, goes to the TSA 209 and is RSA Signed 208 using K_priv_ver (i.e., the secret, S).

In step 4, the message signature, MSG_SIG, is passed back to the application 201 through the secure channel 206. In this case, the channel is achieved through an AES encrypt 207 on the side of the TSA 209 and a white-box (WB) AES decrypt 205 on the side of the application 201. This AES encrypt/decrypt method is known and described in U.S. Pat. No. 7,397,916. The contents of said reference are incorporated by reference herein.

In step 5, the RSA Verify operation 204 is split between two sides. On one side, an RSA Padding scheme 211 is applied to the message, MSG, (from step 1) and WB RSA Exponentiation 203 occurs on the message signature, MSG_SIG, (from step 3). It should be noted here that K_pub_ver should not be a traditional RSA public key such as 65537. Rather, K_pub_ver should to be a large prime, and WB RSA Exponentiation 203 protects this value from being extracted by the attacker.

In step 6, the final step is the verification of two sides (MSG_PAD$^{T1}$ and MSG_PAD$^{T2}$) of an RSA padded signature. This verification takes place in a Property Dependent Transform (PDT) equivalency context 202. The essential aspect of this equivalency context 202 is that it replaces operations of the original application, such that there is a direct dependency on the equivalency. For example, an ADD operation can be replaced with a PDT_ADD operation. The PDT_ADD operation behaves just like an ADD unless the equivalency context does not hold, in which case the result is a randomly large or small value that is guaranteed not to be the correct value. In this way, the behavior of the application 201 is bound to the equivalency context without the need for a jump or direct comparison operation (which can be an attack point).

A further advantageous feature of this final step (step 6) is that the input sides (MSG_PAD$^{T1}$ and MSG_PAD$^{T2}$) to the equivalency context 202 may preferably be transformed with different transforms such that it is not obvious that a comparison is taking place. As described further herein below, such transformations may be provided using known mechanisms such as those disclosed in U.S. Pat. No. 6,594, 761 and U.S. Pat. No. 6,842,862. The contents of said references are incorporated by reference herein. These transformations are chosen to be strong enough that the number of plaintext/transformed-text pairs required in order to identify the transformation is prohibitively large. Thus, an attacker cannot easily identify and replace one side of the operation to perform an attack on the equivalency context 202.

It should be further understood that PDT-dependent operations may be placed at multiple selected places within the protected program. In this manner, program behavior becomes dependent upon the equivalency context in many places. Upon failure of the equivalency context, the program will result in side-effects which cause unwanted program behavior.

The PDT mentioned above will now be described in terms of the aforementioned side-effects. PDT is a method whereby two values (i.e., properties) may be verified to be equivalent, while being in a protected state. This is achieved by storing the calculations in a transformation context using known methods (e.g., such as those mechanisms disclosed in U.S. Pat. No. 6,594,761 and U.S. Pat. No. 6,842,862). The contents of said references are incorporated by reference herein. Property values are set at two distinct times during execution. Evaluation of the context also occurs at a distinct time. Finally, the use of the context works to modify an existing operation. Under normal conditions, the operation will behave as expected. However, under a tampered condition (i.e., when the property equivalency does not hold), the operation will return randomly large or small (i.e., "garbage") values. This will cause side-effects in the program. This manner of behavior is beneficial because it conceals the mechanics of the condition and may be made temporally and spatially disconnected from program failure. There is no program jumping or branching that reveals that a condition is being computed. In contrast, a program jump would reveal an attack point.

It should become readily apparent therefore that any operation can be turned into a property-dependent operation. This ranges from simple arithmetic and logical operations (e.g., add, sub, mul, div, shift, and, or, not), to blocks of operations, and further to full algorithms. The property-dependent behavior serves to operate normally under conditions where the property condition holds, and to behave erratically (i.e., with resultant side-effects) under conditions where the property condition does not hold.

Figure 3:
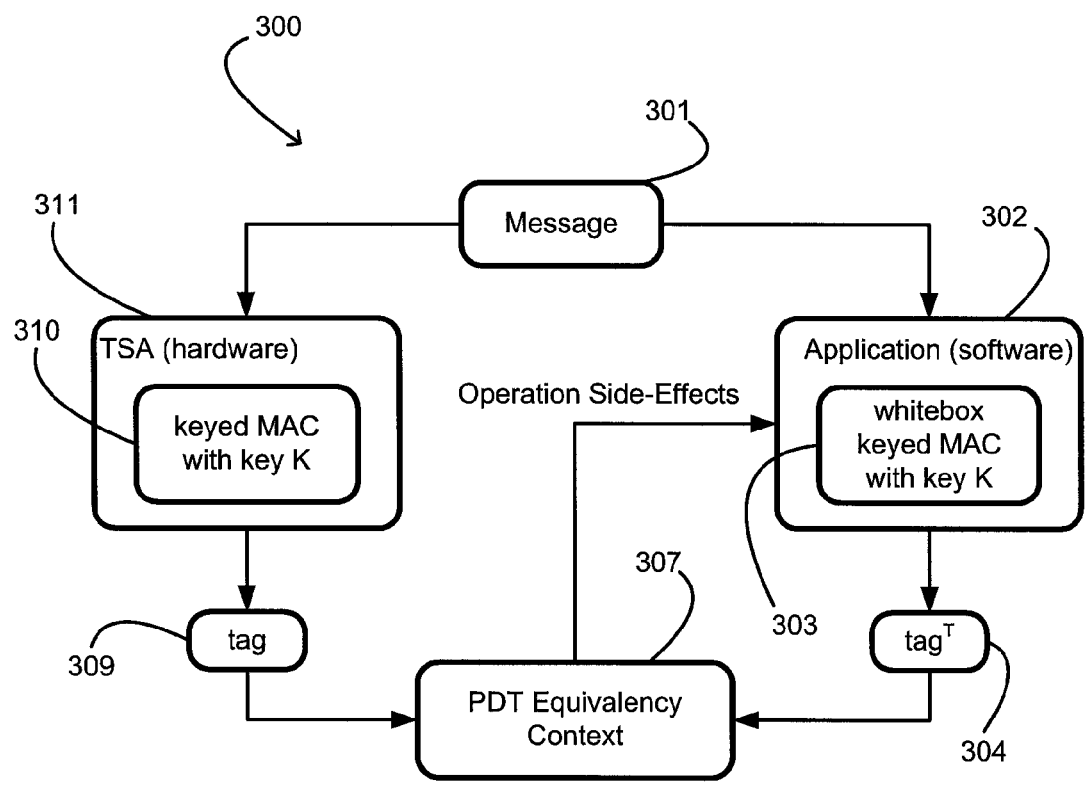
FIG. 3 is a flow diagram in accordance with a second embodiment of the present invention based upon MAC algorithms.

A second embodiment 300 of the present invention is shown by way of FIG. 3. Here, this second embodiment is based on Message Authentication Code (MAC) algorithms. Generally speaking, a MAC algorithm, sometimes called a keyed (cryptographic) hash function, accepts as input a secret key and an arbitrary-length message 301 to be authenticated, and outputs a MAC (sometimes known as a tag). The MAC value protects both a message's data integrity as well as its authenticity by allowing verifiers (who also possess the secret key) to detect any changes to the message content.

In FIG. 3, the TSA 311 on the node-locked hardware side shares a key with the application 302 on the software side. The TSA 311 is able to perform a normal MAC algorithm 310, while the application 302 is protected using a white-box keyed MAC 303 (e.g., cipher-based MAC (CMAC) or hash-based MAC (HMAC)). It should be readily apparent that the shared secret key, K, is provisioned to the application 302 and the TSA 311 at build time in the trusted execution session on the trusted platform. Such provisioning is performed in a manner consistent with that discussed earlier with regard to the first embodiment. The secret key K, which should only be known to the white-box keyed MAC 303 and the TSA 311, acts as an anchor. The execution of the application 302 is correct if and only if its secret key K is the same as the one in the TSA 311. The dependency of the verification of the two output MACs, tag 309 and tag$^T$ 304, to the application 302 is accomplished in the same manner as the previously described first embodiment via the PDT equivalency context 307 whereby operation side-effects may occur upon indication of tampering. The white-box keyed MAC 303 may take on any of a number of implementations for its components, including for example the white-box AES as disclosed in U.S. Pat. No. 7,397,916. The content of said reference is incorporated by reference herein.

Without straying from the intended scope of the present invention, it should further be understood that the present invention is applicable to implementations beyond hardware anchoring as in the hardware-software instances described above. Overall, any mechanism suitably similar to those mentioned above may be used for the TSA in implementing the present invention so long as such mechanism: 1) is able to sign a message based on the secret, S; 2) is able to keep the secret, S, safe from being revealed; and, 3) is inextricably associated with the node (i.e., individual device/platform). Accordingly, the present invention may be used in software to software instances and may include instances provided over a network, a sub-network, or any functional block to functional block. Moreover, the present invention has applicability beyond traditional node-locking of software to an individual instance of a computer. It may be used to bind any program in an untrusted execution environment to a trusted module. Such variations are illustrated by way of FIGS. 4, 5, and 6.

Figure 4:
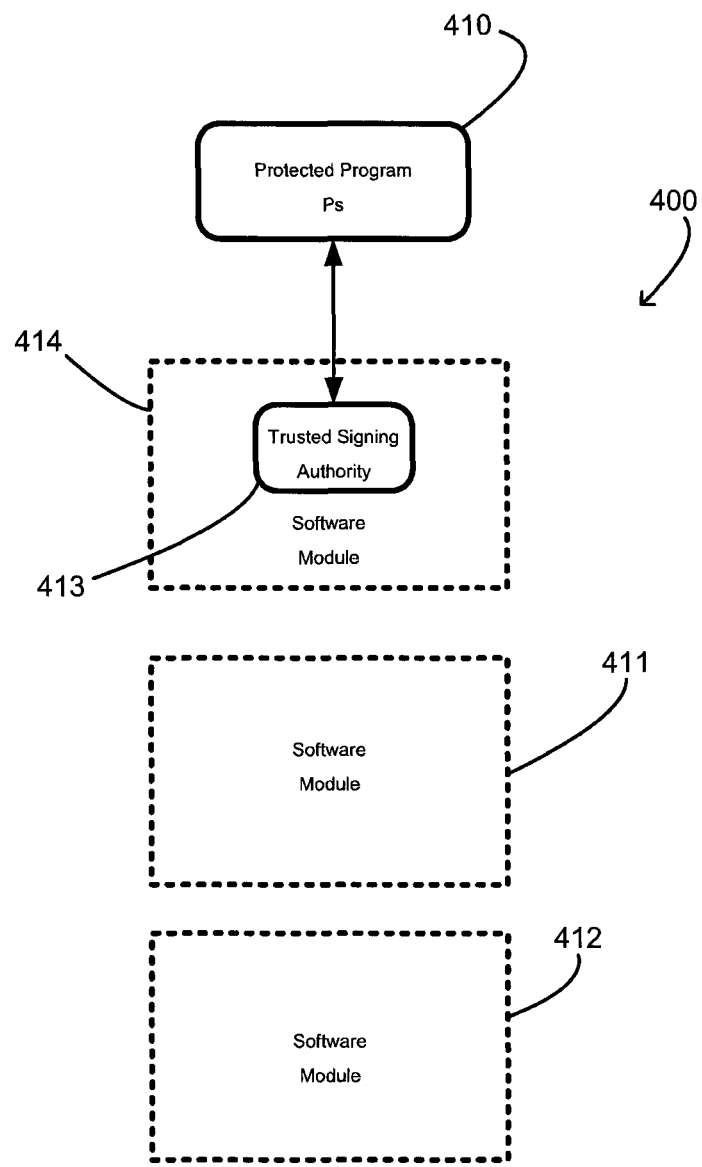
FIG. 4 is a further implementation of the present invention illustrating binding of a protected program to a software module stack.

The present invention may, for example, be used to bind software to software. In FIG. 4, a software to software implementation 400 is illustrated whereby a protected program 410 is strongly bound to a software stack through the method described in the present invention including TSA 413. This software stack could be any set of software modules, 411, 412, 414 that have independent characteristics (e.g., other locking types). As shown, module 414 includes the TSA 413 whereas modules 411 and 412 may implement other software elements. For example, consider a software stack that implements a virtual machine hypervisor or a software stack that implements a set of device drivers.

Figure 5:
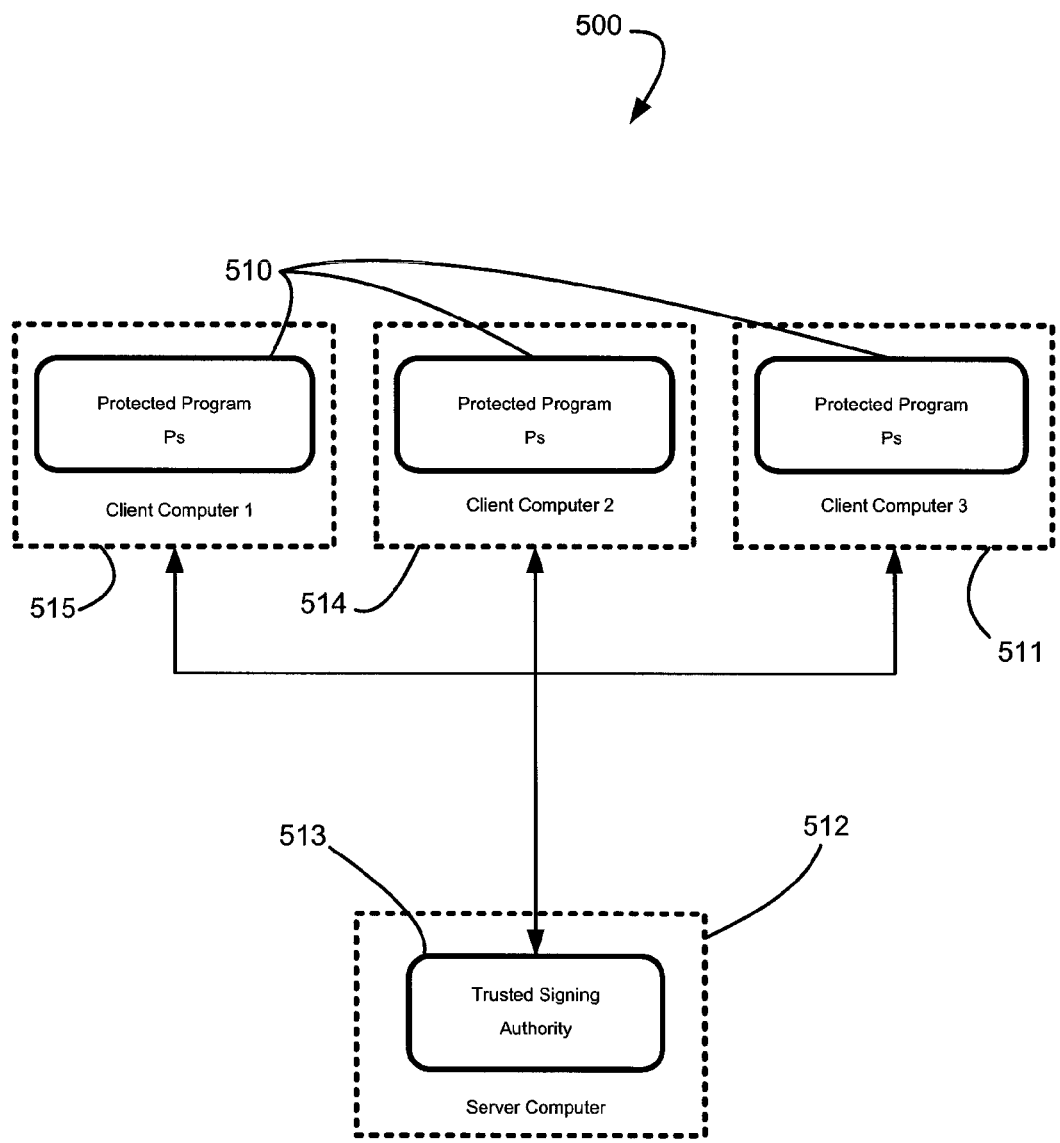
FIG. 5 is another implementation of the present invention illustrating binding of a protected program over a network.

Alternatively, FIG. 5 shows a network implementation 500 in accordance with the present invention being used to protect a plurality of programs 510 to a single TSA 513. These programs 510 may all reside on a single computer and be nodelocked to a TSA on the computer. In contrast, the programs may, as shown in FIG. 5, reside on client computers 511, 514, 515, communicating over a network to a TSA 513 on a server computer 512. This embodiment enforces a requirement that the protected program 510 on a client computer 511, 514, 515 have an available communication mechanism to the server computer 512. This ensures that the server 512 be present and discourages piracy and other attacks of the client programs 510. It should be understood that programs 510 may be the same protected program or may be different protected programs.

Figure 6:
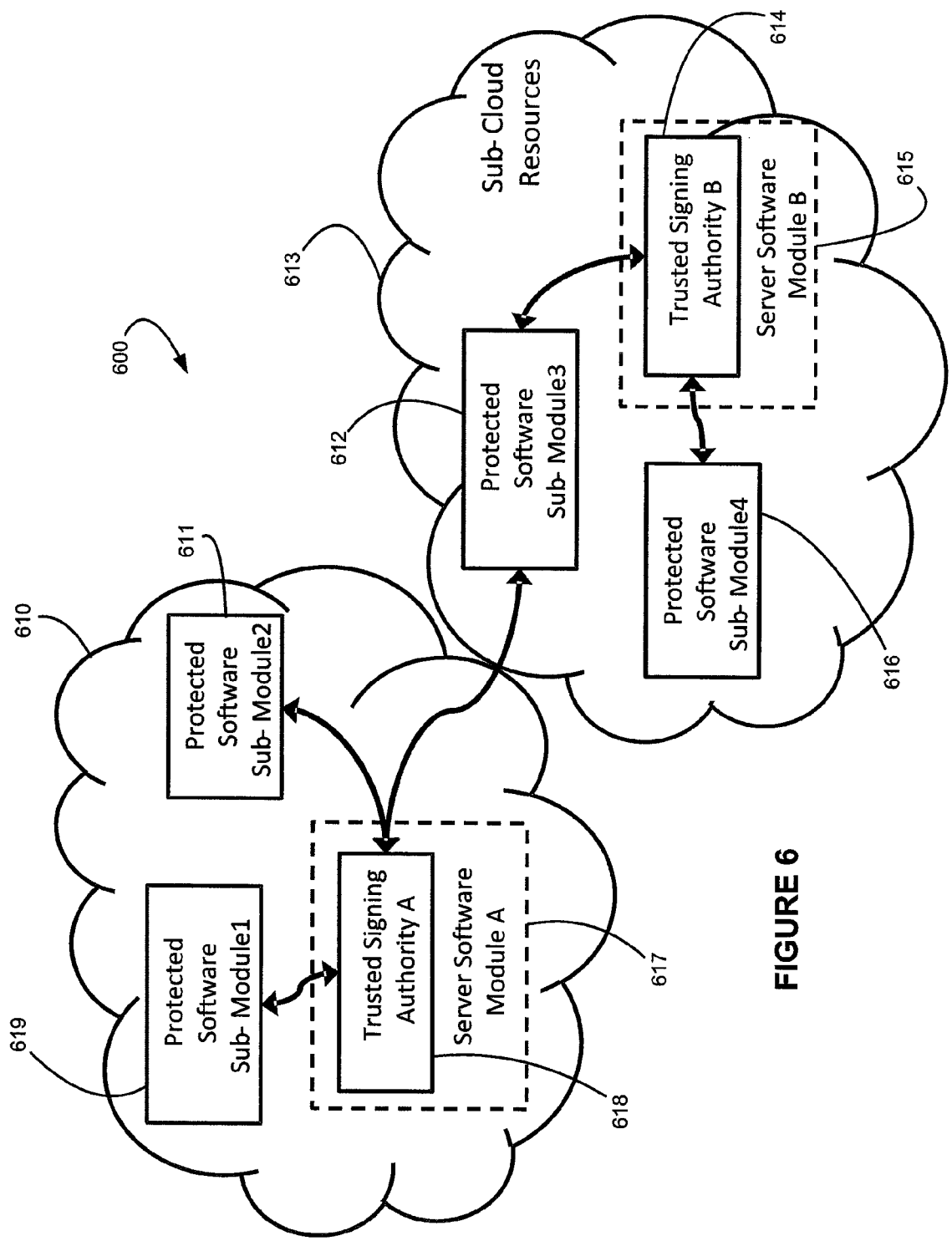
FIG. 6 is still another implementation of the present invention illustrating binding of protected program sub-modules over a cloud-based environment.

In FIG. 6, there is a cloud-base implementation 600 in accordance with the present invention. In this scenario, the present invention is used to bind the execution of protected sub-modules 611, 612, 616, 619 to the presence of TSAs 614, 618 executing on cloud resources 610, 613. The main property of the cloud-base implementation 600 is that applications may execute on any physical resources in the network, where the application owner may not necessarily know what sub-cloud resources are being used to run the application. Furthermore, the applications in the cloud may be easily scaled up or down due to the nearly limitless availability of physical resources. The present invention allows an application to be partitioned into a set of sub-modules 611, 612, 616, 619 which are tightly bound to a TSA 614, 618 executing as a server software module 615, 617. This may provide, for example, a capability to deploy a finite number of TSA servers, while deploying an unbounded number of protected software sub-modules. The owner of the application then has an ability to control all activity over the population of deployed applications through the finite number of TSA servers. This is a further example of the flexibility of the TSA system in accordance with the present invention as applied to applications deployed in the cloud.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system for provisioning a protected instance of a software application, the system comprising:
   a source of entropy;
   one or more processors; and
   one or more memories operatively coupled to at least one of the one or more processors and having instructions stored thereon that, when executed by at least one of the one or more processors, cause the at least one or more processors to:
   generate a secret based on the source of entropy;
   generate a protected instance of the software application by binding the secret to one or more portions of the software application; and
   communicate the secret value to a trusted signing authority;
   wherein the protected instance of the software application is arranged to use a property dependent transform equivalency context comprising one or more operations, wherein the outcome of the one or more operations are dependent on an equivalency of (a) a message signature generated by the trusted signing authority using the secret value and a challenge message directed to both the trusted signing authority and to the protected instance of the software application, and (b) the challenge message.

2. The system as claimed in claim 1 wherein the secret is communicated to the trusted signing authority by way of a secure session.

3. The system as claimed in claim 2 wherein the protected instance executes on an untrusted platform operatively coupled to the trusted signing authority.

4. The system as claimed in claim 3 wherein correct behavior of the protected instance of the software application is enabled by successful runtime verification.

5. The system as claimed in claim 3 wherein the trusted signing authority is a trusted platform module.

6. The system as claimed in claim 3 wherein the trusted signing authority is secure processor.

7. The system as claimed in claim 3 wherein the trusted signing authority is a kernel driver.

8. The system as claimed in claim 3 wherein the trusted signing authority is a hardened software agent.

9. The system as claimed in claim 3 wherein the protected instance is made publicly available.

10. The system as claimed in claim 3 wherein the trusted signing authority is part of a software module stack.

11. The system as claimed in claim 3 wherein one or more protected instances of one or more software applications reside on one or more client computers communicably coupled to the trusted signing authority which resides on a server computer.

12. The system as claimed in claim 3 wherein one or more protected instances of one or more software applications are embodied in protected software sub-modules and bound to one or more trusted signing authorities embodied in server software modules where the protected software sub-modules and server software modules reside on cloud computing resources.

13. The system as claimed in claim 12 wherein the secure session is accomplished via symmetric key encryption.

14. A computer implemented method executed by one or more computing devices for provisioning a protected instance of a software application, the method comprising:
   generating, by at least one of the one or more computing devices, a secret based on a source of entropy;

generating, by at least one of the one or more computing devices, a protected instance of the software application by binding the secret to one or more portions of the software application;

modifying the software application to require runtime verification by a trusted signing authority, wherein verification is based on at least a portion of the secret and runtime data; and communicating the secret value to a trusted signing authority;

wherein the protected instance of the software application is arranged to use a property dependent transform equivalency context comprising one or more operations, wherein the outcome of the one or more operations are dependent on an equivalency of (a) a message signature generated by the trusted signing authority using the secret value and a challenge message directed to both the trusted signing authority and to the protected instance of the software application, and (b) the challenge message.

15. The method as claimed in claim 14 wherein the communicating step occurs by way of a secure session.

16. The method as claimed in claim 15 wherein the secure session is accomplished via symmetric key encryption.

17. The method as claimed in claim 15 wherein the protected instance executes on an untrusted platform operatively coupled to the trusted signing authority.

18. The method as claimed in claim 17 wherein the trusted signing authority is a trusted platform module.

19. The method as claimed in claim 17 wherein the trusted signing authority is secure processor.

20. The method as claimed in claim 17 wherein the trusted signing authority is a kernel driver.

21. The method as claimed in claim 17 wherein the trusted signing authority is a hardened software agent.

22. The method as claimed in claim 17 wherein the protected instance is made publicly available.

23. The method as claimed in claim 17 wherein correct behavior of the protected instance of the software application is enabled by successful runtime verification.

24. The method as claimed in claim 17 wherein the trusted signing authority is part of a software module stack.

25. The method as claimed in claim 17 wherein one or more protected instances of one or more software applications reside on one or more client computers communicably coupled to the trusted signing authority which resides on a server computer.

26. The method as claimed in claim 17 wherein one or more protected instances of one or more software applications are embodied in protected software sub-modules and bound to one or more trusted signing authorities embodied in server software modules where the protected software sub-modules and server software modules reside on cloud computing resources.

* * * * *